No. 705,126. Patented July 22, 1902.
G. OSTEN & W. P. SPALDING.
HORN FOR SOUND RECORDING AND REPRODUCING APPARATUS.
(Application filed June 27, 1901.)
(No Model.)
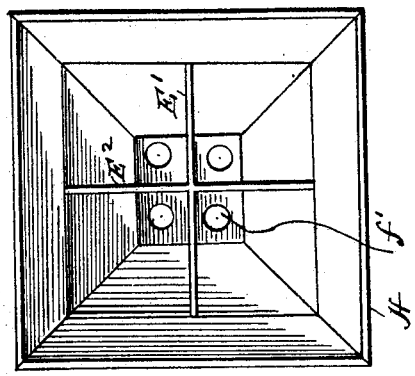
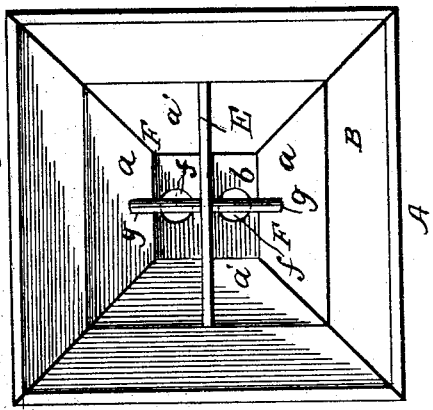
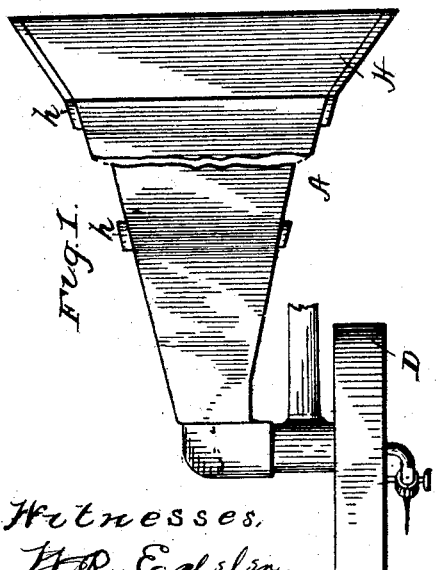
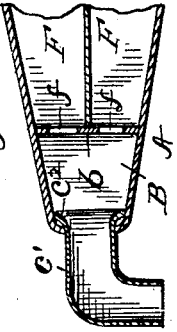
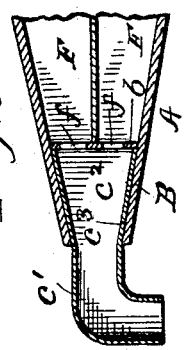
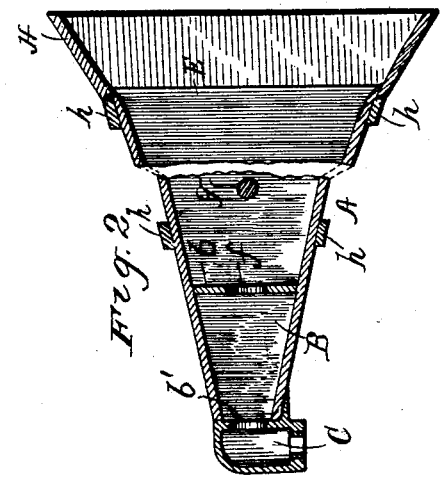

UNITED STATES PATENT OFFICE.

GEORGE OSTEN AND WILLIAM P. SPALDING, OF DENVER, COLORADO.

HORN FOR SOUND RECORDING AND REPRODUCING APPARATUS.

SPECIFICATION forming part of Letters Patent No. 705,126, dated July 22, 1902.

Application filed June 27, 1901. Serial No. 66,301. (No model.)

*To all whom it may concern:*

Be it known that we, GEORGE OSTEN and WILLIAM P. SPALDING, residents of Denver, Colorado, have invented a new and useful Improvement in Horns for Sound Recording and Reproducing Apparatus, which invention is fully set forth in the following specification.

Our Patent No. 685,409, dated October 29, 1901, claims a multiple horn consisting of a plurality of small horns all communicating at their smaller ends with one and the same recorder or reproducer and a hood or bell common to all of the small horns and into which said small horns discharge or from which they receive the sounds at their larger ends.

Although the apparatus of our present invention, in its preferred form, includes the features of construction above referred to, as well as the transmitter described in said patent, the present invention is designed more particularly as an improvement upon the patented invention.

We have discovered that a large horn, of any suitable material, partitioned into a plurality of small horns by a partition or partitions, preferably of wood, acting as a sounding-board, gives improved results, and that still better results are obtained by the use of sound-posts in conjunction with the sounding-board partition or partitions. The manner in which we utilize these discoveries will be best understood by reference to the accompanying drawings, illustrating several embodiments of our invention, and wherein—

Figure 1 is a plan view showing a recorder or reproducer connected with the horn. Fig. 2 is a longitudinal sectional view of the horn. Fig. 3 is a view looking into the large end of the horn. Figs. 4 and 5 are views illustrating modifications of the elbow leading to the recorder or reproducer. Fig. 6 is a view looking into the larger end of a modified construction of horn.

A is the body of the horn, which, as shown, is made of four tapering thin wooden sides $a\ a\ a'\ a'$, secured together along their edges, thus forming a body part of rectangular cross-section. The body part may, however, be made of circular, oval, or any other suitable shape in cross-section.

B is a distributing chamber or mouth at the small end of the horn, bounded at one end by a transverse partition or wall $b$. At its smaller end mouth B communicates, through an opening $b'$, with a throat C, leading through a wooden elbow or short tube $c$, which is secured to the small end of the horn. Elbow or short tube $c$ may be bent, as shown, or straight. At its outer end throat C communicates with a reproducer or recorder D, Fig. 1.

E is a sounding-board extending forward from partition $b$, secured at its side edges to the opposite sides $a'\ a'$ of body A and longitudinally dividing the interior of the latter into two small horns F F, which communicate with the distributing chamber or mouth B through openings $ff$ in partition $b$ on opposite sides of the sounding-board E.

$g\ g$ are two sound-posts interposed between the sounding-board E and the sides $a\ a$. They communicate vibrations from the sounding-board to the sides of the horn, and vice versa.

$h\ h$ are outside strips or ribs extending across sides $a'\ a'$ in a direction practically parallel to the sound-posts and acting to strengthen the tone and vibrations, as well as making the horn more durable. The sound-posts and ribs are of special importance, as they act in practically the same manner as do the sound-post and ribs of a violin. They improve the tone quality by softening and mellowing the same, at the same time increasing the carrying properties and distinctness of the sounds, particularly where the horn is made completely of wood. The metallic sound so common to sound recording and reproducing apparatus is effectually eliminated.

Any double effect that may otherwise be produced by the sounds coming from the two small horns F F is avoided by the action of the single bell or hood H, into which both of said small horns discharge, said hood causing the sounds coming from the separate small horns to blend together before they are finally discharged from the horn. As shown in the drawings, hood H is also made of wood and secured to the end edges of sides $a\ a\ a'\ a'$.

As shown in Fig. 4, the elbow $c'$ instead of being made of wood, as in Figs. 1 and 2, is made of brass or other suitable metal and has a flared or bell-shaped end $c^2$ opening into the distributing-chamber B. Fig. 5 illustrates a somewhat-similar arrangement, the flared or bell-shaped end $c^3$ of the elbow in this casing being of such length as to constitute a lining for the chamber B.

In the form of horn shown in Fig. 6 two sounding-boards $E'$ $E^2$, disposed at right angles to each other longitudinally, divide the interior of the horn into four small horns, each communicating with the distributing-chamber, such as shown in Fig. 2, through an opening $f'$. As the sounding-boards bear against all of the sides of the horn, no sound-posts are necessary in this arrangement.

What we claim is—

1. In sound recording and reproducing instruments, the combination of a multiple horn comprising a plurality of small horns separated from each other by a sounding-board, with a sound recorder or reproducer in communication with said multiple horn.

2. A multiple horn comprising a plurality of small horns separated from each other by a sounding-board and a common distributing chamber or mouth with which the small horns communicate at their smaller ends.

3. A multiple horn comprising a wooden body part divided interiorly into a plurality of small horns by a wooden sounding-board.

4. A horn comprising a plurality of small horns separated from each other by a sounding-board, a common distributing chamber or mouth with which the small horns communicate at their small ends, and a hood or bell common to all of the small horns and into which said small horns discharge or from which they receive the sounds at their larger ends.

5. A horn comprising a body part adapted to communicate at its small end with a recorder or reproducer, a lateral partition in the body part forming a mouth or distributing-chamber at the smaller end of the horn, and a longitudinally-extending sounding-board dividing the interior of the body part outside of the mouth into two small horns communicating with the mouth through openings in the lateral partition.

6. A horn comprising a body part adapted to communicate at its small end with a recorder or reproducer, a lateral partition in the body part forming a mouth or distributing-chamber at the smaller end of the horn, a longitudinally-extending sounding-board dividing the interior of the body part outside of the mouth into two small horns communicating with the mouth through openings in the lateral partition, and a hood or bell common to all of the small horns and into which said horns discharge or from which they receive the sounds at their larger ends.

7. A horn for use with apparatus for recording and reproducing sounds having a sounding-board longitudinally disposed therein.

8. A horn for use with apparatus for recording and reproducing sounds having a sounding-board longitudinally disposed therein and a sound-post interposed between the sounding-board and side wall of the horn.

9. A wooden horn for use with apparatus for recording and reproducing sounds having a wooden sounding-board longitudinally disposed therein and a sound-post interposed between the sounding-board and side wall of the horn.

In testimony whereof we have signed this specification in the presence of two subscribing witnesses.

GEORGE OSTEN.
WILLIAM P. SPALDING.

Witnesses:
W. A. RICE,
L. GOLDMAN.